United States Patent Office 3,459,732
Patented Aug. 5, 1969

3,459,732
CYCLODEXTRIN CARBAMATES
Glenn A. Hull, Oak Park, Earle E. Allen, Jr., Chicago, and Stanley M. Parmerter, Wheaton, Ill., assignors to Corn Products Company, New York, N.Y., a corporation of Delaware
No Drawing. Filed Mar. 22, 1967, Ser. No. 624,985
Int. Cl. C08b 19/08; C08d 9/06
U.S. Cl. 260—209        9 Claims

ABSTRACT OF THE DISCLOSURE

Compositions of matter which are carbamates of cyclodextrin represented by the formula:

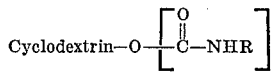

where R may be an alkyl, a cycloalkyl or a hydrogen radical. A method for preparing such carbamates includes reacting a cyclodextrin with an alkyl isocyanate, a cycloalkyl isocyanate, and an alkali metal cyanate salt, or urea. The cyclodextrin carbamates may be used in the various ways in which cyclodextrin is used. New product forms are therefore provided which permit the practitioner to use the products to form various inclusion compounds such as with flavors, aromas and others.

---

This invention relates to novel carbamate derivatives of cyclodextrin and for a method of preparing such carbamate compounds. This invention encompasses various alkyl and cycloalkyl carbamates as well as an unsubstituted carbamate of cyclodextrin.

The cyclodextrins are a group of homologous oligosaccharides that are obtained from starch by the action of enzymes elaborated by *Bacillus macerans*. The cyclodextrins are known as Schardinger dextrins from an early investigator who studied these materials. They are homologous cyclic molecules containing 6 or more α-D-glucopyranose units linked together at the 1,4 position as in amylose. The cyclic molecule may also be referred to as a torus. As a consequence of the cyclic arrangement, this torus is characterized by having neither a reducing end group nor a non-reducing end group. The torus molecule is depicted in the following schematic formula, where the hydroxyl groups are shown in the 2, 3 and 6 positions in the illustrated anhydroglucose units. The leteer *n* may be a number from 4 to 6, or higher.

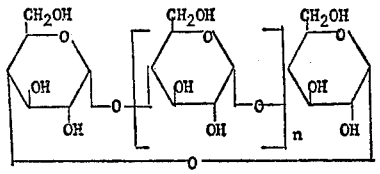

When *n* is 4, the torus molecule is known as α-cyclodextrin or cyclohexaamylose, because the torus contains six anhydroglucose units; when *n* is 5, the seven unit member is known as β-cyclodextrin or cycloheptaamylose; and when *n* is 6, the eight unit member is known as γ-cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglucosylase (*B. macerans* amylase). The source of the enzyme is usually a culture of *Bacillus macerans* which is grown under conventional conditions on conventional media containing sources of nitrogen, carbon, growth factors and minerals. The cyclodextrin transglucosylase may be produced by following published teachings such as, for example, those described by D. French in Methods in Enzymology, S. P. Colowick and N. O. Kaplan, editors, Academic Press, New York, N.Y., vol. V, 1962, pp. 148–155.

The cyclodextrin transglusocylase activity in cultures of *Bacillus macerans* may be measured by the Tilden-Hudson procedure as described by these two workers in J. Bacteriol, 43, 527–544, 1942. In general, the cyclodextrin transglucosylase is added to a dilute solution of a gelatinized starch, whereupon a conversion to cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma, may be fractionated by procedures such as those described by D. French, et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

Cyclodextrin is known as a clathrating compound, that is, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Cyclodextrin has established utility, and is the subject of study for further applications. It is understandably desirable to provide novel cyclodextrin structures to be used as inclusion compounds, and for other purposes.

One object of this invention is to provide new cyclodextrin carbamates to provide the art with additional materials which can be used in conventional ways to exploit the conventional clathrating properties of the cyclodextrins.

Another object is to provide new cyclodextrin carbamates which may be employed as intermediates in methods for preparing desirable end products.

Still another object of the invention is to provide unsubstituted as well as various alkyl and cycloalkyl substituted carbamates of cyclodextrin.

Yet another object of this invention is to provide new cyclodextrin carbamates which have desirable properties.

A still further object is to provide a method whereby cyclodextrin carbamates may be prepared by efficient process steps.

The foregoing objects are attained together with still other objects which will occur to the practitioner by considering the following disclosure.

The cyclodextrin carbamates of the invention may be further represented by the following formulas:

I 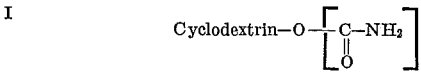

II 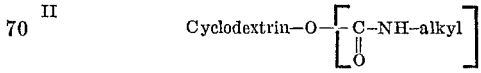

III 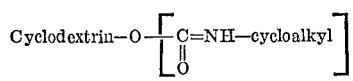

The first cyclodextrin carbamate is unsubstituted whereas the second and third are substituted, respectively, by alkyl or cycloalkyl groups. The alkyl substitution may be a lower alkyl or a longer chain alkyl. When present as a lower alkyl substituent, the alkyl group usually contains less than 6 carbon atoms. Higher alkyl groups of 6 or more carbon atoms can also be present. Thus the alkyl group may be a lower alkyl radical as methyl, ethyl, propyl, butyl, or pentyl or alternately, a higher alkyl group as octadecyl, octyl, decyl, dodecyl, heptyl, hexadecyl and hendecyl. The cycloalkyl group may be various saturated cycloalkyl groups such as cyclopentyl, cyclohexyl, and cycloheptyl. Preferred are cycloalkyl groups containing up to about 7 carbons. It is also provided that the alkyl and cycloalkyl groups may be further substituted, as with halogeno groups.

As is known, the anhydroglucose unit may have different degrees of substitution (D.S.) from one to three. In a given quantity of a cyclodextrin derivative, there will generally be some cyclodextrin molecules that are not substituted at all (D.S., O), together with other molecules that have different degrees of substitution, from 1 to 3. A statistical average is employed to characterize the average D.S. of the entire quantity, although the figure is ordinarily stated as the D.S. rather than the average D.S. The carbamates of cyclodextrin prepared according to this invention may have a varying range of D.S. which may be as little as 0.0001, up to the maximum level of 3. Irrespective of the number of molecules of cyclodextrin which are reacted, or the actual sequence of substitution, or the number of anhydroglucose units involved, the general formula is intended to represent products where the substitution may occur to various degrees at all or less than all anhydroglucose units in all or less than all cyclodextrin molecules. This may be expressed herein in various ways, for example, by referring to an average D.S., a varying D.S. per average anhydroglucose unit, or an average D.S. per anhydroglucose unit. All such terms will include the foregoing concepts.

The cyclodextrin carbamates are prepared by reacting a cyclodextrin or a mixture of homologous cyclodextrins with an organic isocyanate, an acidified solution of an alkali metal cyanate salt or urea. The organic isocyanate will be selected from various alkyl and cycloalkyl isocyanates, and may be represented by the formula

where R is an alkyl, a cycloalkyl or a substituted alkyl or cycloalkyl.

The alkali metal cyanate salts may be represented by the following formula

where M is an alkali metal such as potassium or sodium.

Urea may also be reacted with the cyclodextrin to obtain the unsubstituted cyclodextrin carbamate. The reactions of this type are generally conducted in the presence of an alkaline medium, except when an alkali metal cyanate salt is the reactant. In such a case the reactions are conducted in the presence of an acidic medium, whereupon cyanic acid is formed in situ. The cyanic acid thereupon forms the unsubstituted carbamate of a cyclodextrin.

The following examples are presented to teach various ways of practicing the invention. Such examples, however, are only illustrative embodiments and should not be construed as being exclusive as to the actual compositions of matter or process steps employed.

EXAMPLE I

Cyclodextrin N-octadecyl carbamate

A solution of 27.6 g. of β-cyclodextrin in 800 ml. of dry pyridine is brought to reflux, and to this refluxing solution is added, slowly and with stirring, 50 g. of n-octadecyl isocyanate. The mixture is refluxed for six hours and then concentrated to a volume of 200 ml. A by-product is 1,3-di-n-octadecyl urea which separates upon cooling, and is then removed by filtration. Water is added to the filtrate to cause the product to separate. The collected product is then suspended in boiling water to remove pyridine. The product is then removed by filtration, washed with ethanol and dried to give a yield of 44.5 g. of white solid, M.P. 213°–220° C. Analysis shows the product to contain 2.75% nitrogen which corresponds to a D.S. of 0.65.

EXAMPLE II

Cyclodextrin carbamate from alkali metal cyanate

A solution is prepared from 40 g. of potassium cyanate in 200 ml. of water, and to this solution is added 81 g. of β-cyclodextrin. The mixture is stirred in an ice bath at 0°–5°, during which time, 42 ml. of concentrated hydrochloric acid is added slowly over a two hour period. The solid is collected and washed with 200 ml. of water. The crude solid is collected in a yield of 86 g., and it decomposes above 255° C. A sample is crystallized from boiling water, and it melts at 285°–295° C. Analysis of the crystallized sample shows 1.0% N which corresponds to a D.S. of 0.012.

EXAMPLE III

Cyclodextrin carbamate from urea

A solution is prepared from 10.5 g. of urea in 75 ml. of water, and to this solution is added 56.7 g. of β-cyclodextrin. The mixture is stirred well and filtered. The dry solid is heated in a vacuum oven at 100° C. for 18 hours. The product is then washed with two 100 ml. portions of water. The product decomposes above 295° C. Analysis shows it contains 0.8% N which corresponds to a D.S. of 0.095.

EXAMPLE IV

Cyclodextrin N-cyclohexylcarbamate

An anhydrous solution is prepared from 113 g. of β-cyclodextrin in 600 ml. of pyridine, and to this solution is added 300 g. of cyclohexylisocyanate. The mixture is heated at 100° C. for 4 hours, and the solution is then diluted with 3 liters of methanol before the product is precipitated with water. The light tan solid product is collected and washed thoroughly with boiling water. The yield of the solid is 269 g. and it melts at 205°–209° C. Analysis of the product shows 7.2% N which corresponds to a D.S. of 2.8.

The cyclodextrin carbamates may be used in the various ways in which cyclodextrin is used. New product forms are therefore provided which permit the practitioner to use the products to form various inclusion compounds such as with flavors, aromas and others.

The longer chain alkyl substituted carbamates may be used as surface active agents. The carbamate products show altered water solubility over the cyclodextrins as such. The lower alkyl substituted carbamates tend to display a reduced water solubility with higher degrees of substitution, and the long chain alkyl substituted carbamates exhibit such reduced water solubility even with lower degrees of substitution. Such altered water solubility allows a more versatile practice in the formation of inclusion compounds, among other uses.

The unsubstituted cyclodextrin carbamates may additionally be employed as intermediates, for example, to be reacted with formaldehyde to obtain N-methylol derivatives which can undergo cross-linking. Also, the cyclodextrins may be reacted with diisocyanates to make a polyurethane-type product of cross-linked structure.

The invention may now be practiced in the various ways which will occur to practitioners, and all such practice is intended to comprise a part of the present invention so long as it falls within the scope of the appended claims as given further meaning by the language of the preceding specification.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A cyclodextrin carbamate represented by the formula:

Cyclodextrin—O[CONHR]

where R is of the class consisting of hydrogen, alkyl and cycloalkyl.

2. Cyclodextrin carbamate.

3. A product as in claim 1 which is represented by the formula:

Cyclodextrin—O[CONH-alkyl]

where the alkyl group is a lower alkyl having less than about 6 carbons.

4. A product as in claim 3 where the alkyl group is a higher alkyl having more than about 6 carbon atoms.

5. Cyclodextrin n-octadecylcarbamate.

6. A product as in claim 1 which is represented by the formula:

Cyclodextrin—O[CONH-cycloalkyl]

7. A product as in claim 6 where the cycloalkyl contains up to about 7 carbons.

8. Cyclodextrin n-cyclohexylcarbamate.

9. A product as in claim 1 wherein the cyclodextrin moiety contains 6 and more than 6 cyclic anhydroglucose units, and the expression within the brackets represents various degrees of substitution per average anhydroglucose unit.

References Cited

UNITED STATES PATENTS

| | | | |
|---|---|---|---|
| 2,671,779 | 3/1954 | Gaver et al. | |
| 2,868,780 | 1/1959 | Minkema | 260—234 |
| 3,086,010 | 4/1963 | Mattheaus et al. | 260—234 |
| 3,153,002 | 10/1964 | Wismer et al. | 260—209 |
| 3,300,473 | 1/1967 | Christoffel et al. | 260—209 |

LEWIS GOTTS, Primary Examiner

JOHNNIE R. BROWN, Assistant Examiner

U.S. Cl. X.R.

99—140; 252—351, 357; 260—9, 77